United States Patent
Sato et al.

(10) Patent No.: US 10,711,854 B2
(45) Date of Patent: Jul. 14, 2020

(54) CLUTCH DEVICE AND MOTOR UNIT USING SAID CLUTCH DEVICE

(71) Applicant: Adamant Namiki Precision Jewel Co., Ltd., Tokyo (JP)

(72) Inventors: Norikazu Sato, Kuroishi (JP); Yasuyuki Kobayashi, Kuroishi (JP); Kinya Odagiri, Kuroishi (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 335 days.

(21) Appl. No.: 15/859,025

(22) Filed: Dec. 29, 2017

(65) Prior Publication Data

US 2018/0119755 A1    May 3, 2018

Related U.S. Application Data

(63) Continuation of application No. PCT/JP2016/064393, filed on May 13, 2016.

(30) Foreign Application Priority Data

Jun. 30, 2015 (JP) ................................ 2015-131243

(51) Int. Cl.
*F16D 43/206* (2006.01)
*H02K 7/10* (2006.01)
(Continued)

(52) U.S. Cl.
CPC .......... *F16D 43/206* (2013.01); *F16D 7/044* (2013.01); *F16D 11/14* (2013.01);
(Continued)

(58) Field of Classification Search
CPC .... F16D 43/206; F16D 43/2024; F16D 11/14; F16D 7/044; F16D 2011/008; H02K 7/116; H02K 7/10; H02K 2213/03; H02K 7/108
(Continued)

(56) References Cited

U.S. PATENT DOCUMENTS 508,426 A * 11/1893 Klipstein ........................ 464/39
954,774 A * 4/1910 Beard .............................. 464/38
1,821,543 A * 9/1931 Coultas ................... F16D 7/044
464/39

FOREIGN PATENT DOCUMENTS

CN 202997833 U 6/2013
FR 749550 A * 7/1933 ...................... 464/38
(Continued)

OTHER PUBLICATIONS

International Search Report issued in PCT/JP2016/064393; dated Aug. 16, 2016.

*Primary Examiner* — Greg Binda
(74) *Attorney, Agent, or Firm* — Studebaker & Brackett PC

(57) ABSTRACT

A clutch device includes an input disc, an output disc, and a biasing member configured to press the input disc against the output disc. A rotation load applied to an output shaft separates the input disc from the output disc against biasing force of the biasing member. The input disc and the output disc include opposing surfaces, each of which includes axially disengageable overlapping tooth portions. Recessed and raised portions of each tooth portion are formed continuously in a radial direction and are alternately arranged in a circumferential direction. Each of the curved shapes of the recessed and raised portions is maintained at a respective identical height while a circumferential width thereof continuously expands in a radially outward direction. Also (Continued)

disclosed is a motor unit including the clutch device. The disclosed clutch device reduces, e.g., deformation or damage of a disengageable portion, and therefore, can improve durability.

7 Claims, 10 Drawing Sheets

(51) Int. Cl.
  *H02K 7/116* (2006.01)
  *F16D 43/202* (2006.01)
  *F16D 7/04* (2006.01)
  *F16D 11/14* (2006.01)
  *F16D 11/00* (2006.01)

(52) U.S. Cl.
  CPC ........... *F16D 43/2024* (2013.01); *H02K 7/10* (2013.01); *H02K 7/116* (2013.01); *F16D 2011/008* (2013.01); *H02K 2213/03* (2013.01)

(58) Field of Classification Search
  USPC .................................................... 464/38, 39
  See application file for complete search history.

(56) References Cited

FOREIGN PATENT DOCUMENTS

| | | |
|---|---|---|
| JP | H05-58959 U | 8/1993 |
| JP | 2004-330823 A | 11/2004 |
| JP | 2006-322466 A | 11/2006 |

\* cited by examiner

CLUTCH DEVICE AND MOTOR UNIT USING SAID CLUTCH DEVICE

TECHNICAL FIELD

The present invention relates to a clutch device configured to disconnect a power transmission path when an excessive rotation load acts on an output shaft and a motor unit using the clutch device.

BACKGROUND ART

Typically, the invention of this type includes, as described in, e.g., Patent Literature 1, a clutch device including an output shaft (2), a clutch disc (38) and an input disc (28) supported on an outer peripheral portion of the output shaft, and a coil spring (44) configured to bias the clutch disc and the input disc such that the clutch disc and the input disc are pressed against each other. Note that a numerical value in parentheses indicates a reference numeral in Patent Literature 1.

In this clutch device, one end surface of the clutch disc is provided with a trapezoidal engagement recessed portion (42), and an opposing surface of the input disc is provided with a substantially ridge-shaped engagement raised portion (37). When an excessive rotation load acts on the output shaft, an inclined surface of the engagement recessed portion and an inclined surface of the engagement raised portion slide against each other by the rotation load, and in this manner, these portions in a fitted state are disengaged. Such a clutch device is sometimes referred to as a "torque limiter" or a "safety clutch," for example.

According to such a typical technique, in a case where the rotation load is rapidly applied to the output shaft, a case where the rotation load is extremely larger than expected, a case where the rotation load is repeatedly received multiple times, and the like, there is a probability that the engagement raised portion is deformed or damaged. For this reason, durability of the engagement raised portion might be increased by a material change. However, this leads to a cost increase.

CITATION LIST

Patent Literature

PATENT LITERATURE 1: JP-A-2006-322466

SUMMARY OF THE INVENTION

Problems to be Solved by the Invention

The present invention has been made in view of the above-described typical situation, and is intended to provide a clutch device configured so that durability can be improved by reduction in deformation, damage, and the like of a disengageable portion and a motor unit using the clutch device.

Solution to the Problems

One solution to the above-described problems is a clutch device including an input disc rotatably and axially movably supported on an outer peripheral portion of an output shaft, an output disc fixed to the outer peripheral portion of the output shaft, and a biasing member configured to press the input disc against the output disc. The input disc is separated from the output disc against biasing force of the biasing member by a rotation load applied to the output shaft. An output-disc-side surface of the input disc and an input-disc-side surface of the output disc are provided with tooth portions, the tooth portions overlapping with each other and being disengageable in an axial direction. Each tooth portion is configured such that a recessed portion and a raised portion formed continuously in a radial direction are alternately arranged in a circumferential direction. Each of the recessed portion and the raised portion is formed in such a curved shape that the each of the recessed portion and the raised portion is maintained at an identical height while the circumferential width thereof continuously expands in a radial outward direction.

Effects of the Invention

The present invention is configured as described above, and therefore, can reduce, e.g., deformation or damage of the disengageable portion to improve the durability.

BRIEF DESCRIPTION OF THE DRAWINGS

FIG. 5 is a longitudinal sectional view of an output shaft, the clutch device, and the like.

DESCRIPTION OF THE EMBODIMENTS

Figure 1:
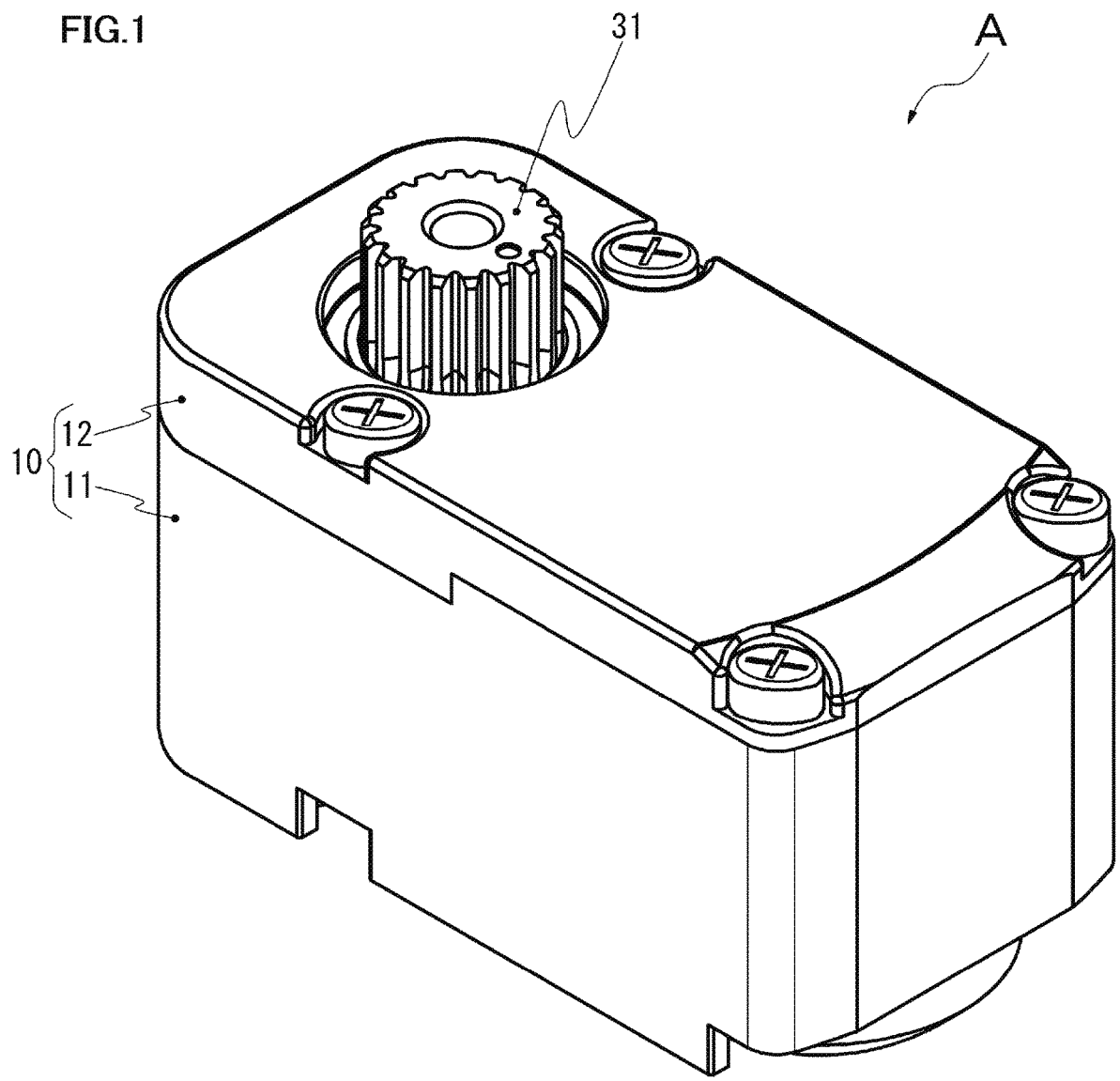
FIG. 1 is a perspective view of an example of a motor unit using a clutch device according to the present invention.
Figure 2:
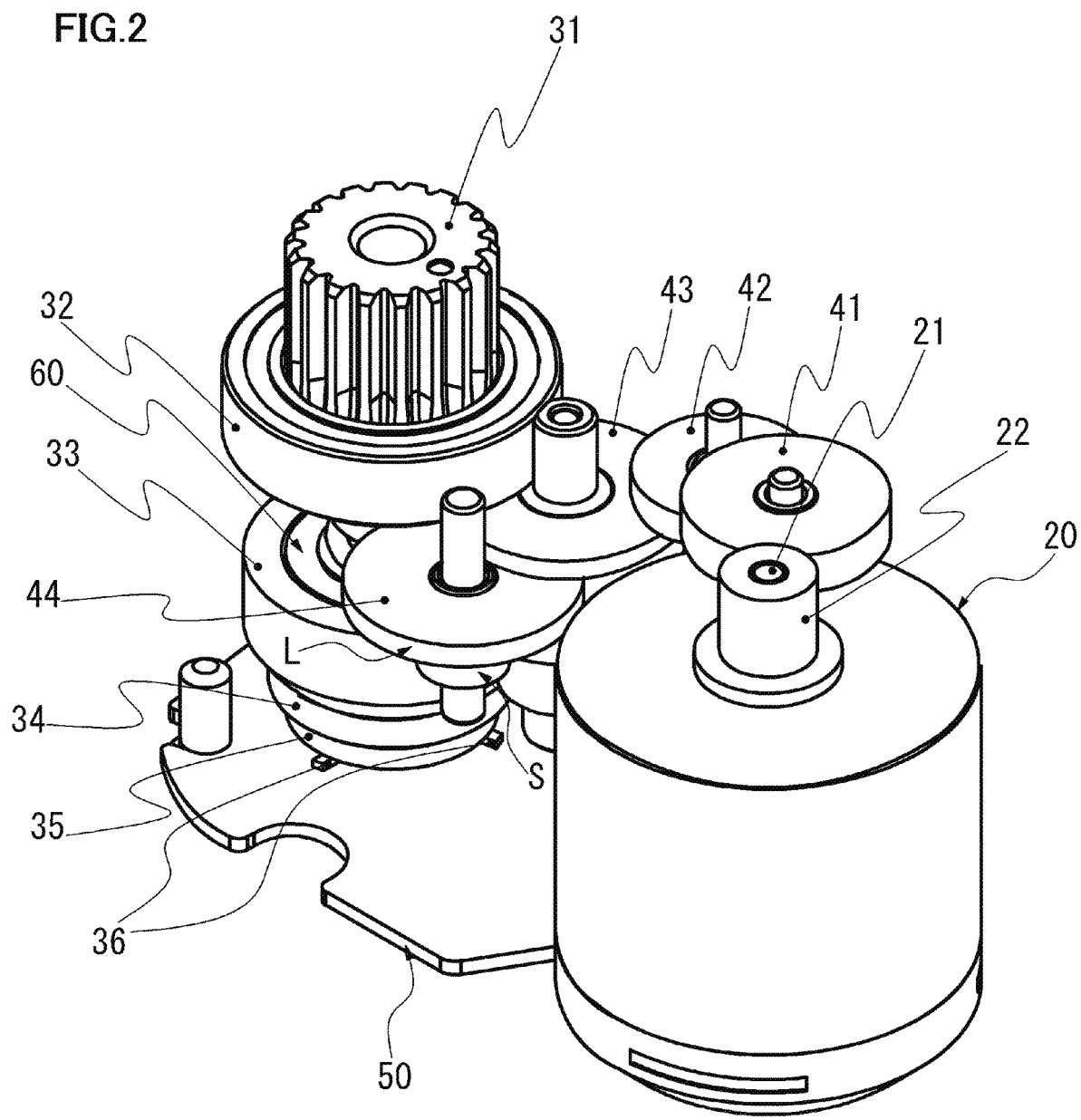
FIG. 2 is a perspective view of an internal structure of the motor unit.

One of features of the present embodiment relates to a clutch device including an input disc rotatably and axially movably supported on an outer peripheral portion of an output shaft, an output disc fixed to the outer peripheral portion of the output shaft, and a biasing member configured to press the input disc against the output disc. The input disc is separated from the output disc against biasing force of the biasing member by a rotation load applied to the output shaft. Specifically, an output-disc-side surface of the input disc and an input-disc-side surface of the output disc are provided with tooth portions, the tooth portions overlapping with each other and being disengageable in an axial direction. Each tooth portion is configured such that recessed portions and raised portions formed continuously in a radial direction are alternately arranged in a circumferential direction, and each of the recessed portions and the raised portions is formed in such a curved shape that the each of the recessed portions and the raised portions is maintained at an identical height while the circumferential width thereof continuously expands in a radial outward direction.

According to such a configuration, e.g., deformation or damage of the tooth portions can be reduced, and therefore, durability of the clutch device can be improved.

For a specific preferable form, each of the recessed portions and the raised portions is, as other features, formed in such an arc sectional shape that the radius thereof continuously increases in the radial outward direction of each disc.

For allowing for escaping of a small extraneous substance and the like, the bottom of each recessed portion is, as other features, provided with a small recessed portion having a smaller circumferential width than that of the recessed portion.

For allowing for smooth sliding between the input and output discs, the recessed portions and the raised portions are, as other features, formed such that the pressure angle of a pressure-contact portion between the raised portion of the input disc and the raised portion of the output disc continuously increases in the radial outward direction of each disc by the rotation load.

For allowing for more smooth sliding between the input and output discs, the recessed portions and the raised portions are, as other features, formed such that a relationship of $\theta \geq \tan^{-1}\mu$, is satisfied at any position in the disc radial direction, where the pressure angle is $\theta$ and the coefficient of static friction between both discs is $\mu$.

For allowing for more smooth sliding between the input and output discs, the dimensions of each portion are, as other features, set to satisfy relationships of $p=2\pi r/n$, $R=\pi r/2n \cos \theta$, $w=\pi r/n$, and $h=R(1-\sin \theta)=$Constant, where the pitch of the raised portion in the case of the optional radius r of each disc is p, the radius of a surface of the raised portion in the case of the radius r is R, the circumferential width of the raised portion is w, the height of the raised portion is h, and the number of raised portions at each disc is n.

As other features, the clutch device having the above-described features is used for a motor unit including, in a case, a motor provided with a drive gear on a front side of a rotor shaft, and a driven shaft being substantially parallel to the rotor shaft and having a driven gear on a back side with respect to the front side. Rotation force of the drive gear is transmitted to the driven gear by a gear mechanism to rotate the driven shaft. Specifically, the driven shaft is used as the output shaft. The driven shaft is provided with the output disc, the input disc, and the biasing member of the above-described clutch device. The driven gear and the input disc are integrally and rotatably coupled together.

Embodiment

Next, a preferable embodiment with the above-described features will be described in detail with reference to the drawings.

FIG. 1 illustrates an example of a motor unit A using a clutch device 60 according to the present invention.

The motor unit A includes, in a case 10, a motor 20 provided with a drive gear 22 on a front side of a rotor shaft 21, an output shaft 30 provided substantially parallel to the rotor shaft 21 and having a driven gear 33 on a back side with respect to the front side, and a plurality of spur gears 41, 42, 43, 44 configured to transmit rotation force from the drive gear 22 to the driven gear 33. The clutch device 60 is formed in the driven gear 33.

Note that in the present specification, the "front side" means a side provided with the drive gear 22 in an axial direction of the rotor shaft 21.

The case 10 includes a hollow rectangular box-shaped case body 11 opening at a front end surface thereof, and a lid member 12 detachably attached to close an opening of the case body 11. The case body 11 and the lid member 12 are integrally molded of a synthetic resin material.

The motor 20 includes a cylindrical casing 22, a stator and a coil (not shown) fixed to an inter peripheral surface of the casing 22, a rotor (not shown) supported to rotate in the stator, and the rotor shaft 21 fixed to a center portion of the rotor and protruding forward on a front end side thereof. The motor 20 forms a brushless DC motor.

The drive gear 22 is concentrically fixed to the front end side of the rotor shaft 21 of the motor 20. The drive gear 22 is a spur gear, and engages with a large wheel L of the spur gear 41 as described later.

In the case 10, the output shaft 30 is disposed substantially parallel to the rotor shaft 21 of the motor 20 with a clearance in an orthogonal direction, and is rotatably supported on an inner wall surface of the case 10.

An output gear 31, a front bearing member 32, the driven gear 33, a back bearing member 34, and a magnetic rotary body 35 are, in this order from the front side, fixed to an outer peripheral portion of the output shaft 30 in an annular pattern.

According to the illustrated example, the output gear 31 is a spur gear, and is exposed with the output gear 31 protruding forward from a front end surface of the case 10. According to the illustrated example, the output gear 31 is configured as a member integrated with the output shaft 30. Note that as other examples, the output shaft 30 and the output gear 31 as separate bodies may be coupled together.

Moreover, according to the form of an object (not shown) targeted for driving by the motor unit A, the output gear 31 can be replaced with other types of gears such as a worm gear and a helical gear.

The front bearing member 32 and the back bearing member 34 are well-known bearing members such as a ball bearing and a sliding bearing. The front bearing member 32 is fixed to an inner surface of the case 10 through a bearing bracket and the like, and an inner peripheral portion of the front bearing member 32 rotatably supports a front portion of the output shaft 30 with respect to the driven gear 33. In a substantially similar manner, the back bearing member 34 is fixed to the inner surface of the case 10 through a bearing bracket and the like, and an inner peripheral portion of the back bearing member 34 rotatably supports a back portion of the output shaft 30 with respect to the driven gear 33.

The driven gear 33 is a substantially-cylindrical spur gear supported on the outer peripheral portion of the output shaft 30. The driven gear 33 engages with a small wheel S of the spur gear 44 as described later, and receives the rotation force from the small wheel S.

In the driven gear 33, the clutch device 60 configured to disconnect a transmission path of the rotation force when an excessive rotation load acts on the output shaft 30 is provided.

The magnetic rotary body 35 is a substantially-discoid bipole (in other words, a single pair of poles) permanent magnet with an N-pole on a half side in a radial direction and an S-pole on the remaining half side in the radial direction. Other examples of the magnetic rotary body 35 may include a form with multiple pairs of poles.

On the back side of the magnetic rotary body 35 having the above-described configuration, a control board 50 is fixed to a bottom portion of the case body 11. The control board 50 integrally includes a drive circuit configured to control driving power of the motor 20, a plurality of magnetic detection sections 36 configured to detect the magnetic rotary body 35, and the like.

The magnetic detection sections 36 are Hall elements configured to output voltage signals according to a detected magnetic flux. The magnetic detection sections 36 include two magnetic detection sections provided on the control board 50 to face a back end surface of the magnetic rotary body 35. These two magnetic detection sections 36 are arranged at an angular interval of 90° in a circumferential direction, and are configured to output sinusoidal signals according to the magnetic pole position of the magnetic rotary body 35.

Each of the spur gears 41, 42, 43, 44 is configured such that the large wheel L on the front side and the small wheel S on the back side are concentrically and integrally coupled together. The outer diameters of the large wheel L and the small wheel S in each spur gear are optionally set according to a speed reduction ratio between the rotor shaft 21 and the output shaft 30.

These spur gears 41, 42, 43, 44 are arranged in a stepwise pattern from the front side of the rotor shaft 21 to the back side of the output shaft 30 such that adjacent ones of the large wheels L and the small wheels S in the horizontal direction engage with each other.

Figure 4:
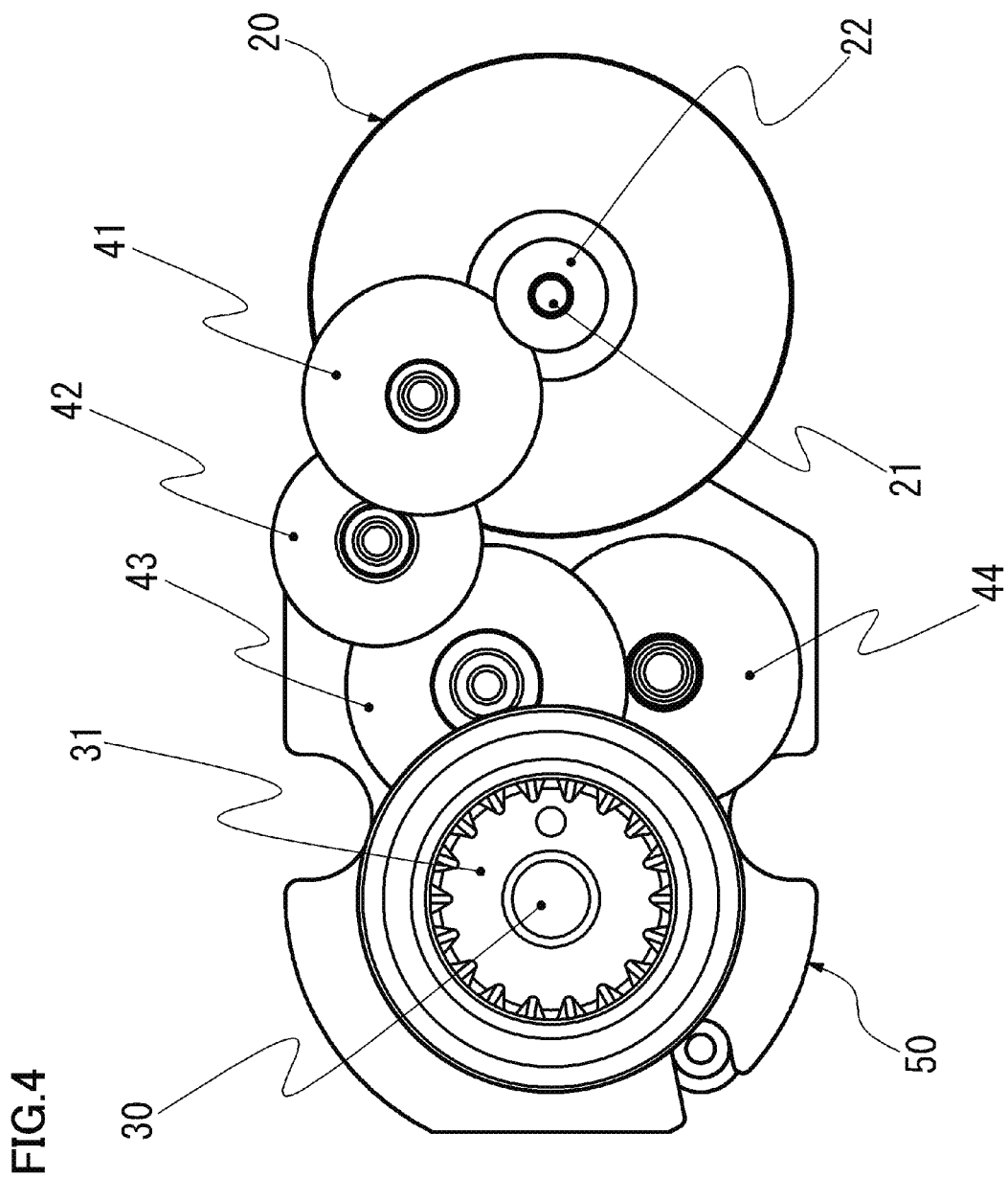
FIG. 4 is a plan view of the internal structure.

Further, when viewed in plane from one side of the rotor shaft 21 in the axial direction, these spur gears 41, 42, 43, 44 are, as illustrated in FIG. 4, arranged in a substantially curved pattern such that the transmission path of the rotation force is curved in a substantially S-shape. Each of the spur gears 41, 42, 43, 44 is, through a rotary shaft and the like, rotatably supported on the inner surface of the case 10 or the drive gear 22, for example.

Arrangement of these spur gears 41, 42, 43, 44 will be described in detail. The spur gear 41 closest to the rotor shaft 21 is positioned on one side (an upper side as viewed in FIG. 4) in a cross direction with respect to a virtual plane connecting the rotor shaft 21 and the output gear 31, and the large wheel L of the spur gear 41 on the front side engages with the drive gear 22.

Figure 3:
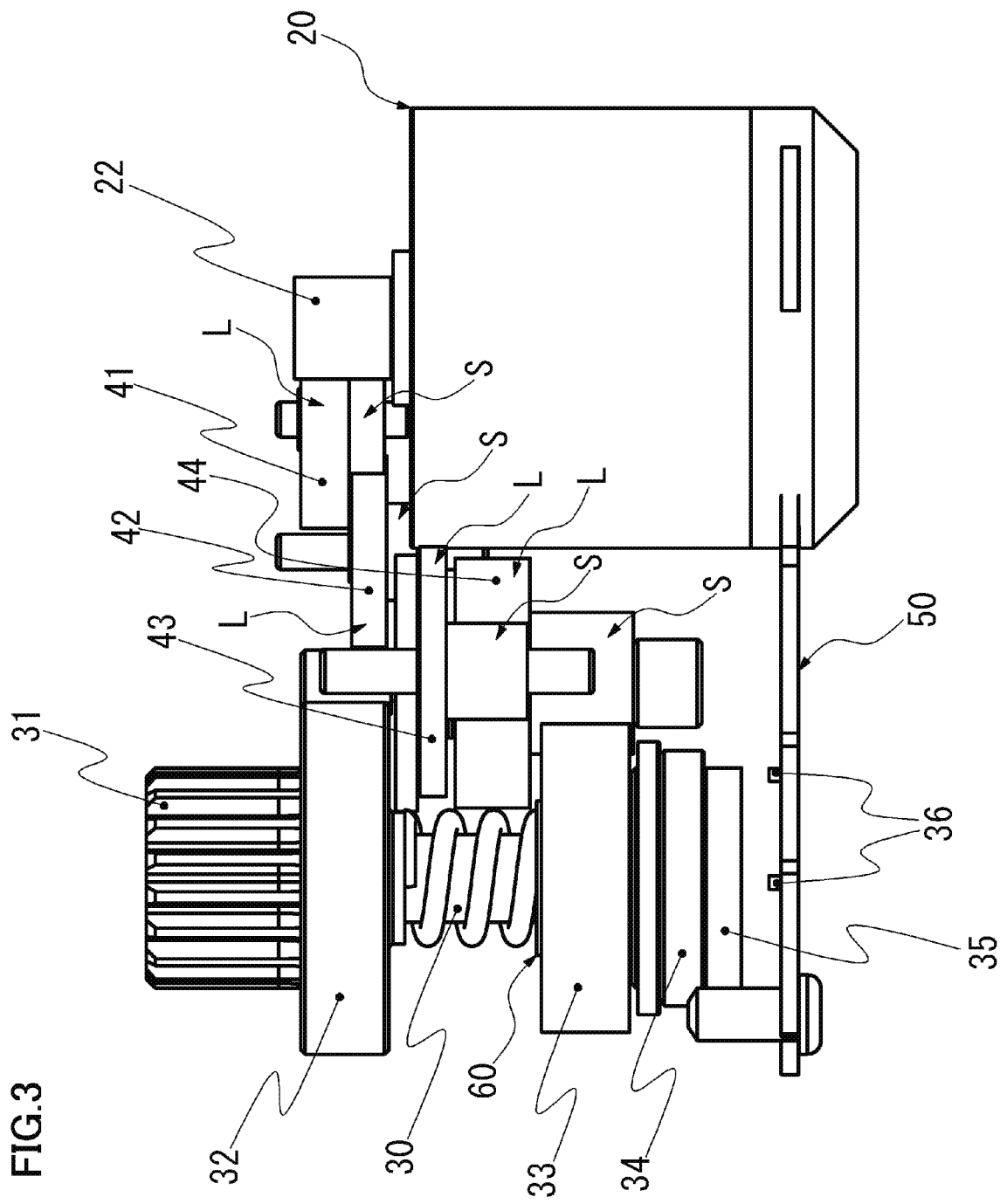
FIG. 3 is a side view of the internal structure.

The next spur gear 42 is positioned further on the one side with respect to the spur gear 41 (see FIG. 4), and the large wheel L of the spur gear 42 on the front side engages with the small wheel S of the spur gear 41 (see FIG. 3).

The next spur gear 43 is positioned on the opposite side (a lower side as viewed in FIG. 4) of the one side with respect to the spur gear 42, and the large wheel L of the spur gear 43 on the front side engages with the small wheel S of the spur gear 42 (see FIG. 3).

The spur gear 44 closest to the output gear 31 is positioned on the opposite side (the lower side as viewed in FIG. 4) of the one side with respect to the above-described virtual plane. The large wheel L of the spur gear 44 on the front side engages with the small wheel S of the spur gear 43, and the small wheel S of the spur gear 44 on the back side engages with the driven gear 33 (see FIG. 3).

Figure 5:
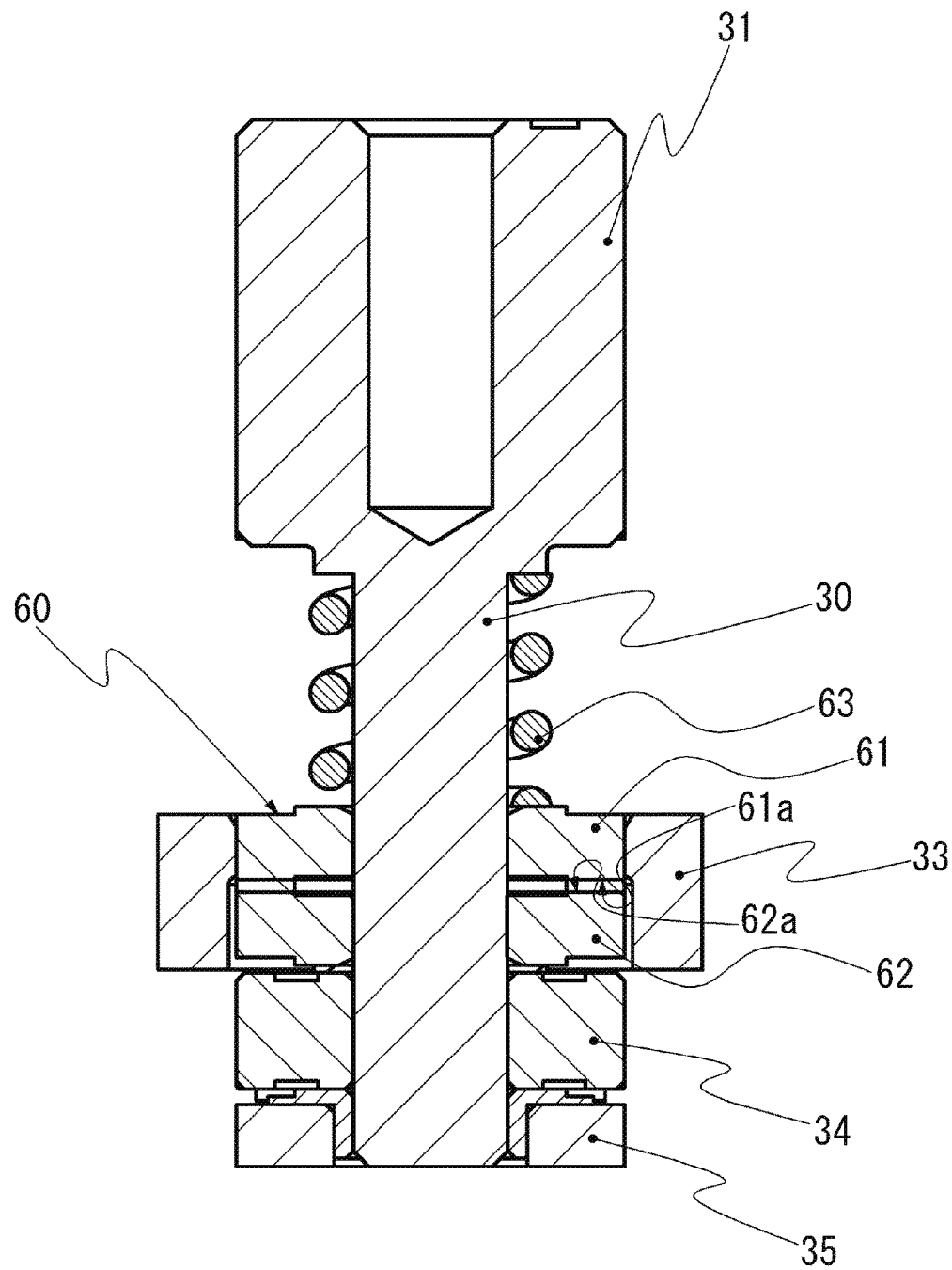

The clutch device 60 includes an input disc 61 rotatably and axially movably supported on the outer peripheral portion of the output shaft 30, an output disc 62 positioned on the back side (a lower side as viewed in FIG. 5) of the input disc 61 and unrotatably and axially unmovably fixed to the outer peripheral portion of the output shaft 30, and a biasing member 63 configured to press the input disc 61 toward the output disc 62 (see FIG. 5). In the case of an excessive rotation load on the output shaft 30 from the outside, the clutch device 60 separates the input disc 61 from the output disc 62 against biasing force of the biasing member 63.

In description below, a "disc radial direction" means radial directions of the input disc 61 and the output disc 62, and a "disc radial outward direction" means a direction apart from a center portion in the disc radial direction. Moreover, a "disc thickness direction" means a direction orthogonal to the disc radial direction (in other words, an axial direction of the disc). Further, a "disc circumferential direction" means a circumferential direction of the input disc 61 or the output disc 62.

The input disc 61 is a substantially discoid member. The output shaft 30 is, in a loose fitting manner, inserted into the center side of the input disc 61, and the input disc 61 has an annular tooth portion 61a across the entire circumference of an outer peripheral surface close to the output disc 62.

The input disc 61 is inserted into the driven gear 33, and is fixed to an inner peripheral surface of the driven gear 33 to rotate integrally with the driven gear 33. The input disc 61 is pressed against the output disc 62 by the annular biasing member 63 (according to an illustrated example, a compression coil spring) attached to the output shaft 30.

The output disc 62 is a member in a shape substantially symmetrical for the input disc 61 in the axial direction. The output shaft 30 is, in a loose fitting manner, inserted into the center side of the output disc 62, and the output disc 62 has an annular tooth portion 62a across the entire circumference of an outer peripheral surface close to the input disc 61.

The tooth portion 61a of the input disc 61 and the tooth portion 62a of the output disc 62 overlap with each other, and are each formed disengageable in the axial direction.

Figure 6:
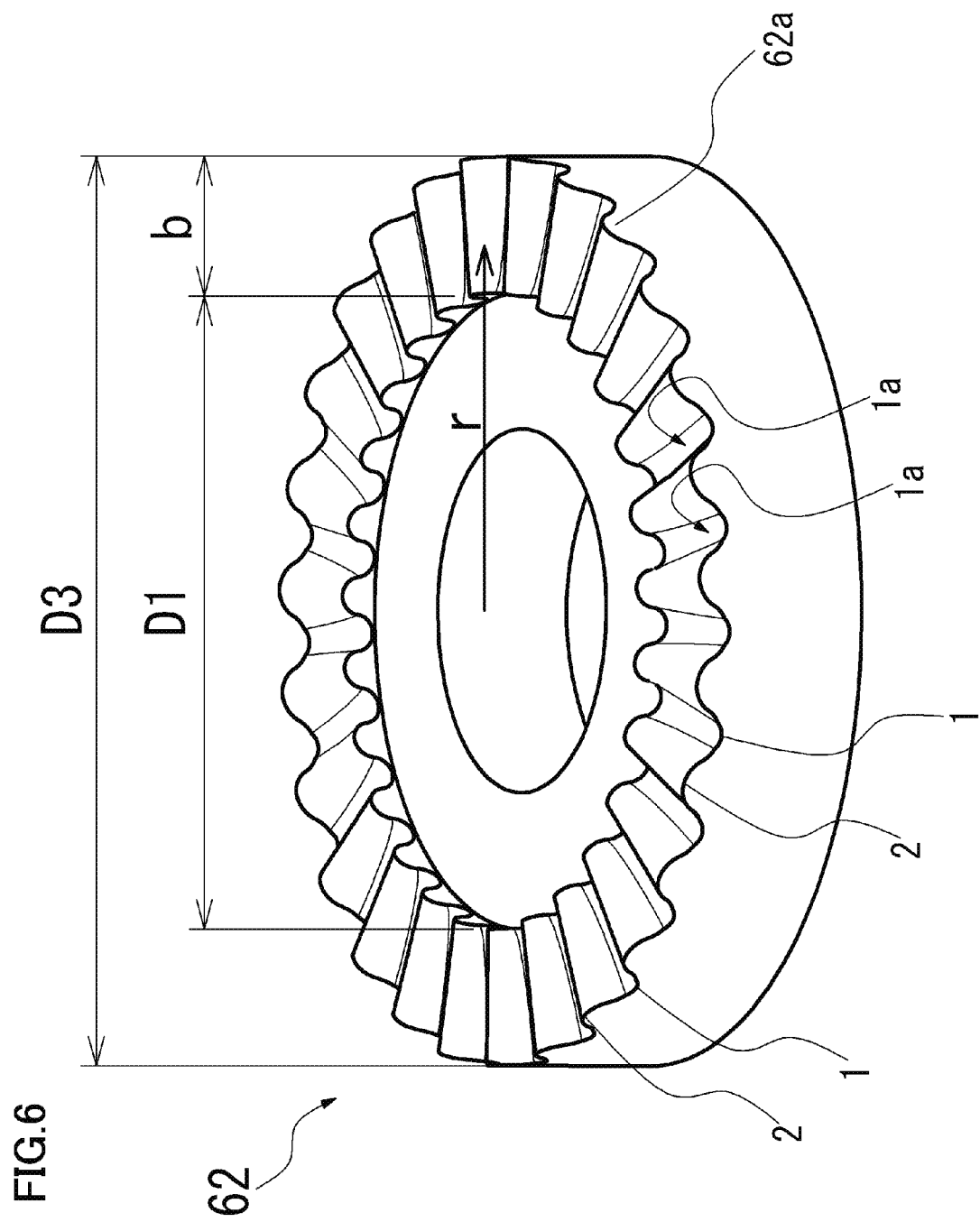
FIG. 6 is a perspective view of an example of an output disc.

Each of these tooth portions 61a, 62a is configured such that recessed portions 1 and raised portions 2 continuously formed in the radial direction are alternately arranged in the circumferential direction (see FIG. 6).

The recessed portion 1 and the raised portion 2 of the input disc 61 (or 62) are in curved shapes symmetrical to each other, and are smoothly connected.

Figure 9:
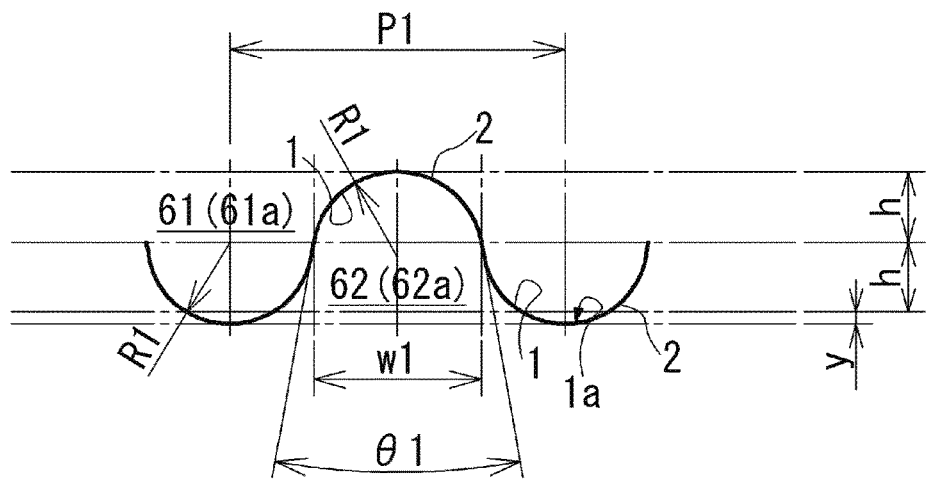
FIG. 9(D1) is a development view of the recessed portion and the raised portion at a position with a diameter D1 in FIG. 8(a), FIG. 9(D2) is a development view of the recessed portion and the raised portion at a position with a diameter D2 in FIG. 8(a), and FIG. 9(D3) is a development view of the recessed portion and the raised portion at a position with a diameter D3 in FIG. 8(a).
Figure 9:
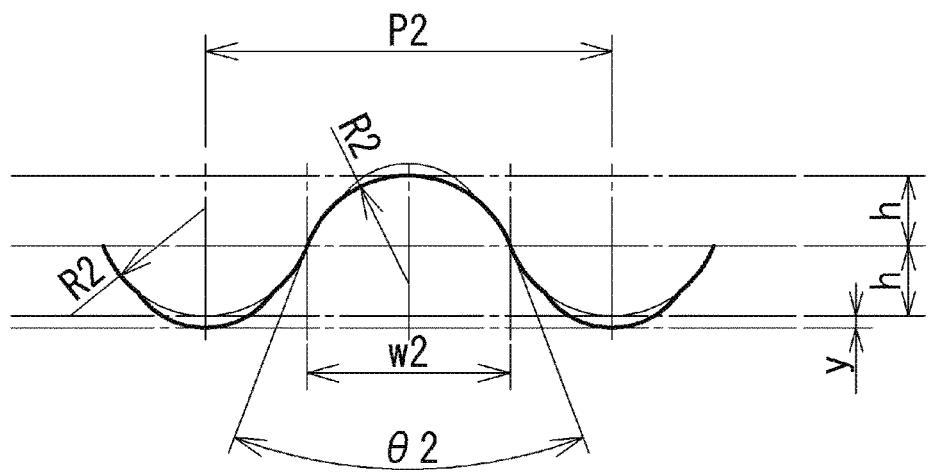
Figure 9:
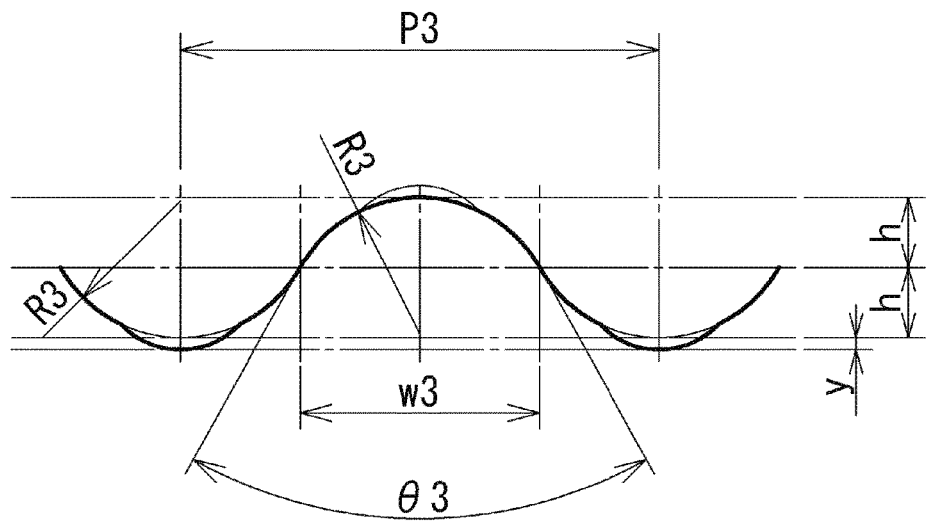

According to an illustrated preferable example, each of the recessed portions 1 and the raised portions 2 has a surface in an arc sectional shape. The height h (the tooth height) of each of the recessed portions 1 and the raised portions 2 along the disc thickness direction is maintained constant in the disc radial direction while a circumferential width w (w1 to w3), a radius R (R1 to R3), a pitch p (p1 to p3), and a pressure angle θ (θ1 to θ3) continuously increase in the disc radial outward direction (see FIGS. 7 and 9(D1) to (D3)).

Figure 7:
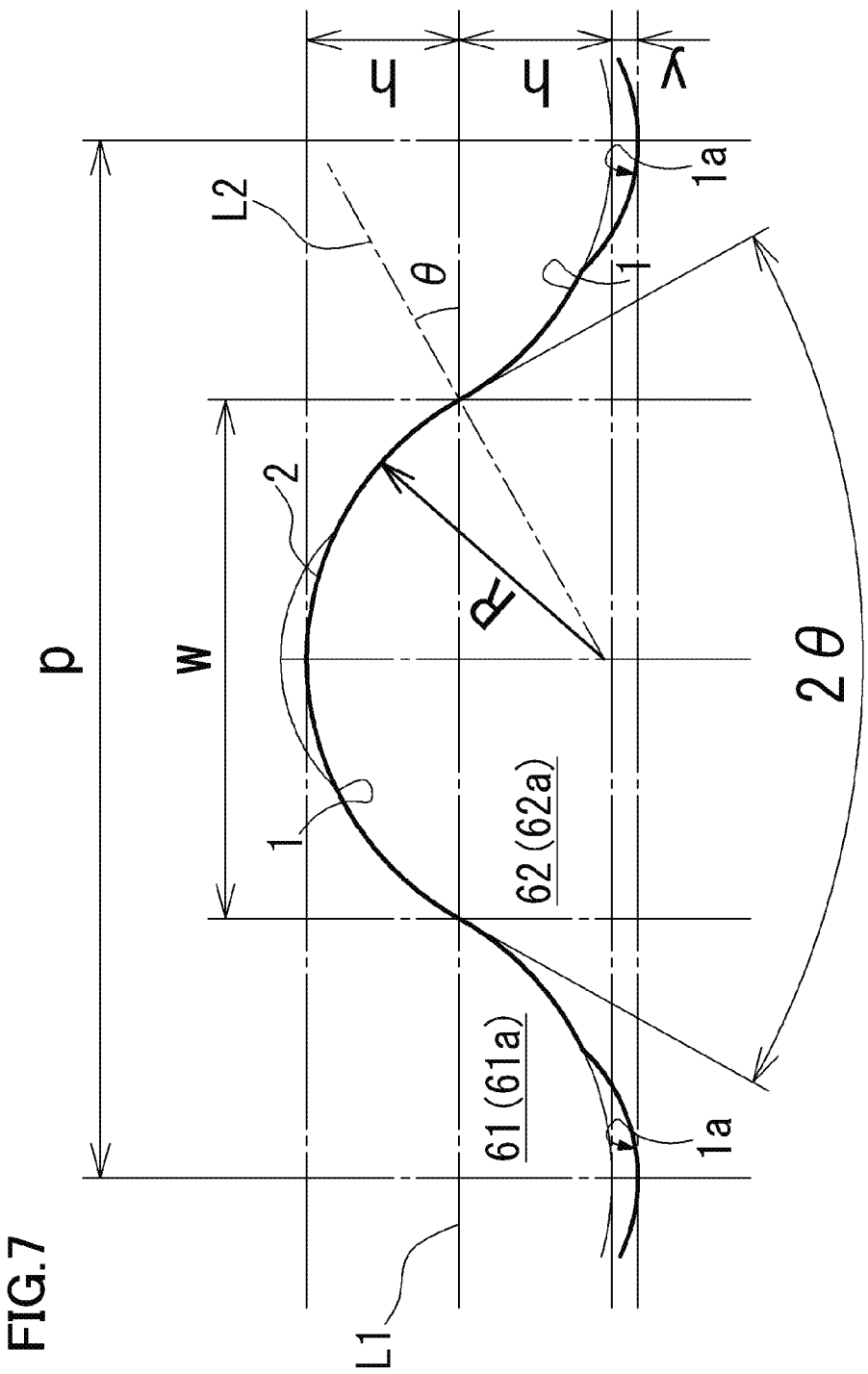
FIG. 7 is an enlarged sectional view of a main portion of a recessed portion and a raised portion.

Note that as illustrated in FIG. 7, the circumferential width w is, at the input disc 61, a distance between two points at which a reference line L1 at a boundary between a surface of the raised portion 2 and a surface of the recessed portion 1 and the surface of the raised portion 2 (or the surface of the recessed portion 1) intersect with each other.

The bottom of the each recessed portion 1 of the output disc 62 positioned on the lower side is provided with a small recessed portion 1a having a smaller width than that of the recessed portion 1 to allow for escaping of a small extraneous substance and the like in a case where the small extraneous substance and the like is sandwiched between both discs 61, 62. The small recessed portion 1a is, across an entire width b, continuously formed in an arc sectional shape with the same depth y in the radial direction of the output disc 62.

Next, the dimensions of the tooth portion 61a of the input disc 61 will be described in detail.

Note that the tooth portion 62a of the output disc 62 has the same dimensions and shape as those of the tooth portion 61a, and therefore, overlapping description of the dimensions will not be repeated.

The dimensions of each portion of the tooth portion 61a are set to satisfy the following relational expressions, where the pitch of the recessed portion 1 and the raised portion 2 in the disc circumferential direction in the case of the optional radius r of the input disc 61 is p, the radius of each surface of the recessed portions 1 and the raised portions 2 in the case of the same radius r is R, the circumferential width of each of the recessed portions 1 and the raised portions 2 is w, the height of each of the recessed portions 1 and the raised portions 2 is h, the number of recessed portions 1 and the raised portions 2 for each disc is n, and the pressure angle at a pressure-contact portion between the raised portion 2 of the input disc 61 and the raised portion 2 of the output disc 62 due to a rotation load is θ (see FIG. 7).

Note that in the present specification, the radius R, the circumferential width w, and the height h are sometimes referred to as a "tooth tip radius," a "tooth thickness," and a "tooth height," respectively.

The height h described herein is, in the case of the optional radius r of the input disc 61, a height dimension from the reference line L1 at the boundary between the surface of the raised portion 2 and the surface of the recessed portion 1 to a top portion of the raised portion 2 (see FIG. 7). Such a height h is the same as a depth dimension from the reference line L1 to the bottom of the recessed portion 1.

Moreover, the pressure angle θ is an angle between the reference line L1 and a normal line L2 common between the raised portion 2 of the tooth portion 61a and the raised portion 2 of the tooth portion 62a. As illustrated in FIG. 7, an angle between tangent lines of right and left pressure-contact points is twice as large as the pressure angle θ on both sides of the raised portion 2.

Further, the radius R is, in the case of the optional radius r of the input disc 61, a radius diameter of an outline of the surface of the raised portion 2 or the recessed portion 1 along the disc circumferential direction (see FIG. 7).

In addition, the pitch p is a pitch for a single interval of a substantially sinusoidal outline of the recessed portion 1 and the raised portions 2 (see FIG. 7).

<Relational Expressions Regarding Tooth Shape>

The pitch p, the tooth tip radius R, the tooth thickness w, the tooth height h, the pressure angle θ, and the like are set to satisfy the following relational expressions:

$$p=2\pi r/n$$

$$R=\pi r/2n \cos\theta$$

$$w=\pi r/n=2R\cos\theta$$

$$h=R(1-\sin\theta)=\pi r(1-\sin\theta)/2n\cos\theta=\text{Constant}$$

$$2hn/\pi r=1/\cos\theta-\tan\theta$$

As described above, the pitch p, the tooth tip radius R, the pressure angle θ, and the like are set to smoothly and continuously change according to the optional radius r of the input disc 61, and therefore, a sectional outline of the recessed portion 1 and a sectional outline of the raised portion 2 can be in arc shapes with a constant tooth height h.

<Pressure Angle θ>

The pressure angle θ is preferably a value satisfying later-described relational expressions.

Figure 10:
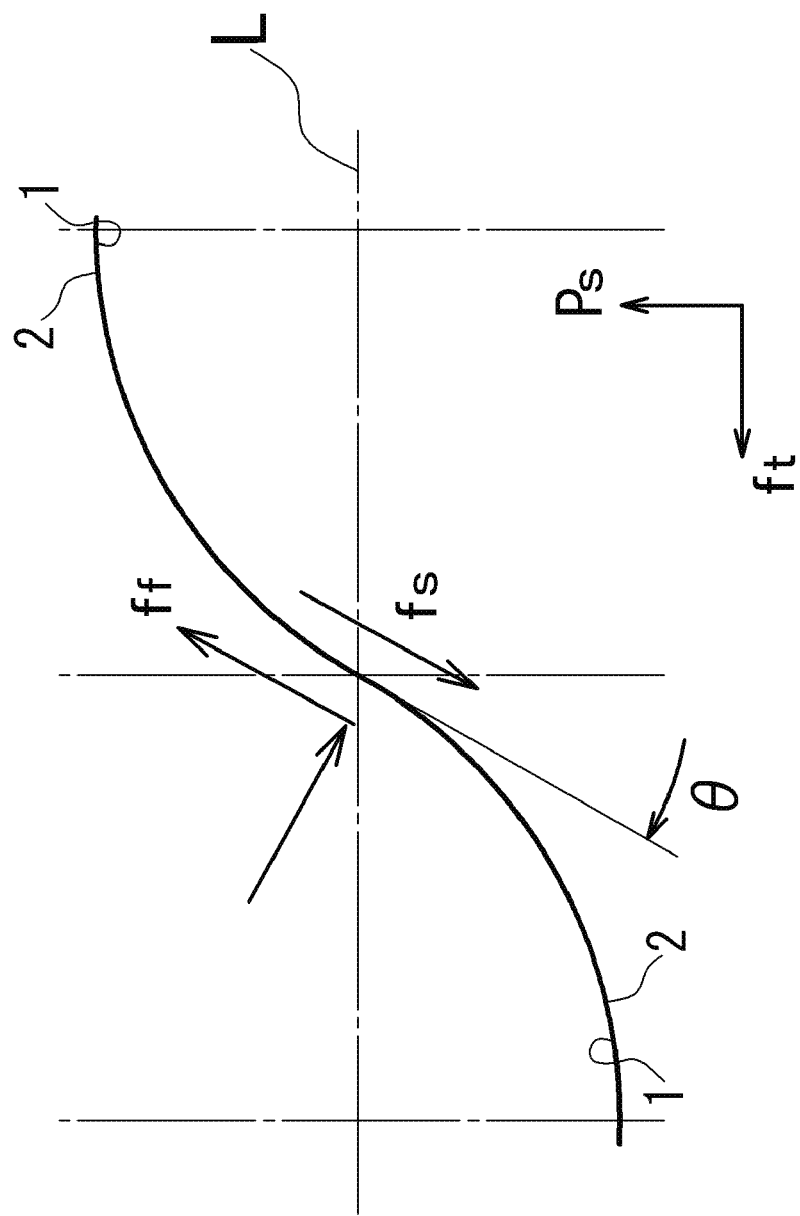
FIG. 10 is a schematic conceptual diagram of force applied to pressure-contact surfaces of the recessed portion and the raised portion.

The tooth portion 61a of the input disc 61 and the tooth portion 62a of the output disc 62 are in the same shape. When the tooth portions 61a, 62a engage with each other in a pressed state, the following relational expressions are satisfied, where at an optional point in the circumferential direction in the case of the optional radius r of each disc 61, 62 (see FIG. 10), the pressure angle is θ, a tooth surface load by a torque is $f_t$, static friction force between the tooth portions 61a, 62a is $f_f$, the coefficient of static friction between the tooth portions 61a, 62a is μ, sliding force between the tooth portions 61a, 62a is $f_s$, and spring force of the biasing member 63 is $P_s$. Note that a value obtained by experiment and the like in advance is used as the static friction coefficient μ according to the materials, surface roughness, and the like of the tooth portions 61a, 62a.

$$f_f=\mu(f_t\cos\theta+P_s\sin\theta)$$

$$f_s=f_t\sin\theta-P_s\cos\theta$$

The following relational expressions are satisfied, assuming that both discs 61, 62 slide against each other in the case of Friction Force=Sliding Force.

The following expression is satisfied by $$\mu(f_t\cos\theta+P_s\sin\theta)=f_t\sin\theta-P_s\cos\theta,$$

$$f_t=(\mu\sin\theta+\cos\theta)P_s/(\sin\theta-\mu\cos\theta),\text{ and}$$

$$P_s=kZ_0\ (k\text{: Spring Constant of Biasing Member 63,}$$
$$Z_0\text{: Initial Deflection of Biasing Member 63).}$$

$$f_t=(\mu\sin\theta+\cos\theta)kZ_0/(\sin\theta-\mu\cos\theta),$$

where $(\mu\sin\theta+\cos\theta)/(\sin\theta-\mu\cos\theta)$ will be herein referred to as a "friction/shape coefficient."

When $\theta\geq\tan^{-1}\mu$ is satisfied, the denominator of the friction/shape coefficient does not become zero, and the tooth surface load $f_t$ is a finite value.

Thus, when, e.g., μ=0.1, a lower limit is $\theta=\tan^{-1}\mu=5.7°$.

<Sliding Torque>

Figure 8A:
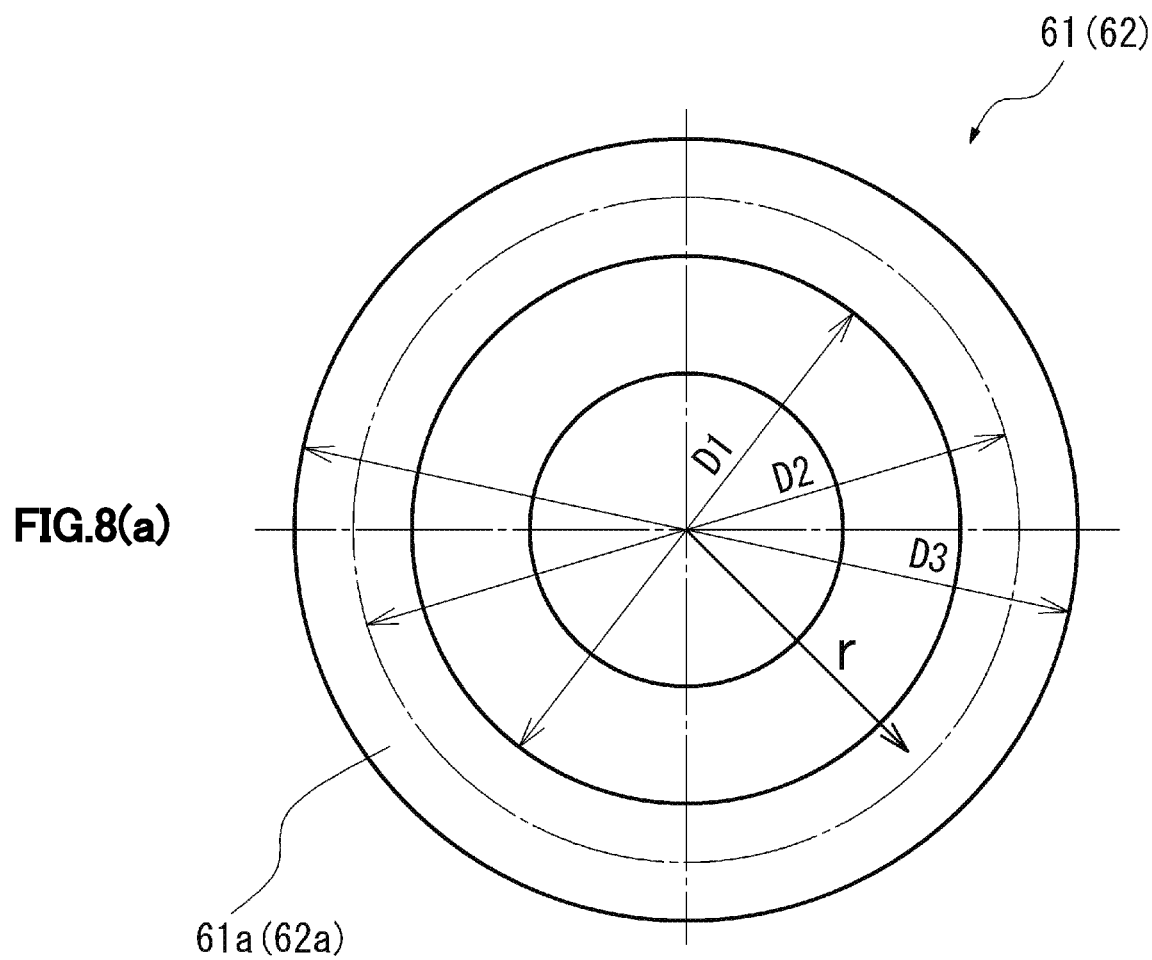
FIG. 8(a) is a plan view of an input disc or the output disc.
Figure 8B:
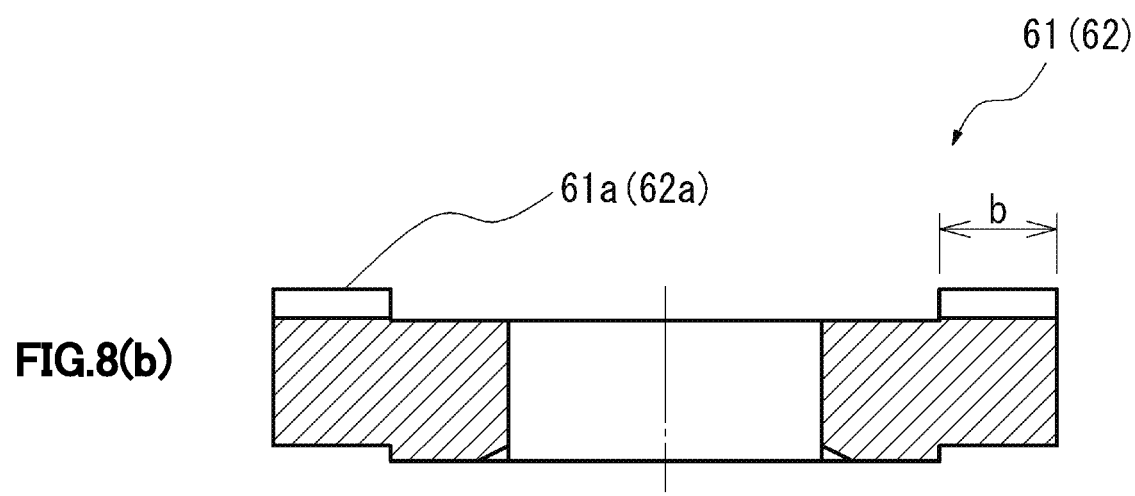
FIG. 8(b) is a longitudinal sectional view of the disc.

When the spring force of the biasing member 63 per unit area is a pressure $p_s$, the following relational expression is satisfied:

$$ps=kZ_0/(\pi(D^2-d^2)/4)$$

where D means the maximum diameter (D3 in FIG. 8(a)) of the tooth portion 61a, 62a and d means the minimum diameter (D1 in FIG. 8(a)) of the tooth portion 61a, 62a.

When the friction/shape coefficient is a, the following expression is obtained:

$$\alpha=(\mu\sin\theta+\cos\theta)/(\sin\theta-\mu\cos\theta)$$

The pressure angle θ satisfies a relationship of the following expression:

$$2hn/\pi r=1/\cos\theta-\tan\theta$$

The sliding force $f_s$ in the case of the optional radius r is obtained by the following expression:

$$f_s=2\pi r\alpha p_s$$

The torque is obtained by multiplying of the sliding force $f_s$ by the radius r. By integration for a radius between an inner diameter d and an outer diameter D, a sliding torque T can be calculated as follows:

$$T = \int_{d/2}^{D/2} f_s r dr = \int_{d/2}^{D/2} 2\pi r^2 \alpha p_s dr = 2\pi p_s \int_{d/2}^{D/2} r^2 \alpha dr \qquad \text{[Expression 1]}$$

Thus, according to the clutch device 60 having the above-described configuration, when an excessive torque is applied to the output shaft 30, the input disc 61 is slidably separated in the axial direction from the output disc 62 so that a power transmission path between both discs 61, 62 can be disconnected. In this state, the tooth portion 61a of the input disc 61 smoothly slides without causing local resistance against the tooth portion 62a of the output disc 62. This can effectively reduce, e.g., deformation or damage of both tooth portions 61a, 62a.

In addition, the dimensions of each portion of the tooth portions 61a, 62a of both discs 61, 62 can be efficiently set using the above-described relational expressions. Thus, a design change can be easily made according to a rotation load torque, housing dimensions, and the like, leading to excellent productivity.

According to the motor unit A using the above-described clutch device 60, the plurality of spur gears 41, 42, 43, 44 are, as described above, arranged in the stepwise pattern and the substantially S-shape. These spur gears are closely spaced, and, e.g., the magnetic rotary body 35 and the control board 50 with the magnetic detection sections 36 are arranged on the back side of such a spur gear group. Thus, e.g., a space between the rotor shaft 21 and the output shaft 30 or a space on the back side of the spur gear group in the case 10 can be effectively utilized. This leads to favorable productivity.

Moreover, as compared to, e.g., a typical technique using a potentiometer, axial protrusion dimensions can be more reduced, and rotation resistance can be also more decreased. Further, because of arrangement of the driven gear 33, the magnetic rotary body 35, and the like as described above, the output shaft 30 can be stably supported.

Note that according to the above-described embodiment, the brushless DC motor is configured as the motor 20. Other examples may include other types of motors, e.g., a brush motor, as the motor 20.

Moreover, according to the above-described embodiment, the four spur gears 41, 42, 43, 44 are provided, but other examples may include a case where the number of spur gears is set to equal to or greater than six or to equal to or less than five.

Further, according to the above-described embodiment, the Hall element is used as the magnetic detection section 36, but other examples of the magnetic detection section 36 may include a magnetic encoder and other sensors.

In addition, according to the above-described embodiment, the number of magnetic detection sections 36 is two, but may be set to one or to three or more according to, e.g., the method for detecting the rotation position of the magnetic rotary body 35.

Moreover, according to the above-described embodiment, the small recessed portions 1a are, as a specifically preferable form, provided only at the output disc 62, but other examples may include a form in which the small recessed portions 1a are provided at each disc 61, 62, and a form in which the small recessed portions 1a are omitted from both discs 61, 62.

Further, according to the above-described embodiment, the tooth portions 61a, 62a are formed close to the outer peripheries of both discs 61, 62 such that no excessive load is applied to each of the recessed portions 1 and the raised portions 2. However, other examples may include a case where the tooth portions 61a, 62a are formed close to the centers of both discs 61, 62 or a case where the tooth portions 61a, 62a are formed to extend from the center to the outer periphery of each disc 61, 62.

In addition, according to the above-described embodiment, the clutch device 60 is applied to a rotation force transmission mechanism in the motor unit A, but as other examples, may be applied to a rotation force transmission mechanism in other components than the motor unit A.

LIST OF REFERENCE NUMERALS

1: Recessed portion
1a: Small recessed portion
2: Raised portion
10: Case
20: Motor
21: Rotor shaft
22: Drive gear
30: Output shaft
32: Front bearing member
33: Driven gear
34: Back bearing member
35: Magnetic rotary body
36: Magnetic detection section
41, 42, 43, 44: Spur gear
50: Control board
60: Clutch device
61: Input disc
61a: Tooth portion
62: Output disc
62a: Tooth portion
63: Biasing member
A: Motor unit
L: Large wheel
S: Small wheel
w: Circumferential width

The invention claimed is:

1. A clutch device comprising:
    an input disc rotatably and axially movably supported on an outer peripheral portion of an output shaft;
    an output disc fixed to the outer peripheral portion of the output shaft; and
    a biasing member configured to press the input disc against the output disc, wherein
    the input disc is separated from the output disc against biasing force of the biasing member by a rotation load applied to the output shaft,
    an output-disc-side surface of the input disc and an input-disc-side surface of the output disc are provided with tooth portions, the tooth portions overlapping with each other and being disengageable in an axial direction,
    each tooth portion is configured such that a recessed portion and a raised portion formed continuously in a radial direction are alternately arranged in a circumferential direction,
    each of the recessed portion and the raised portion is formed in such a curved shape that the each of the recessed portion and the raised portion is maintained at an identical height while a circumferential width thereof continuously expands in a radial outward direction, and
    a bottom of the recessed portion is provided with a small recessed portion having a smaller circumferential width than that of the recessed portion.

2. The clutch device according to claim 1, wherein
the recessed portion and the raised portion are in arc sectional shapes symmetrical to each other, and are each formed such that a radius thereof continuously increases in the radial outward direction of each disc.

3. A motor unit including the clutch device according to claim 1, comprising:
in a case,
a motor provided with a drive gear on a front side of a rotor shaft, and
a driven shaft being substantially parallel to the rotor shaft and having a driven gear on a back side with respect to the front side,
wherein rotation force of the drive gear is transmitted to the driven gear by a gear mechanism to rotate the driven shaft,
the driven shaft is used as the output shaft,
the driven shaft is provided with the output disc, the input disc, and the biasing member, and
the driven gear and the input disc are integrally and rotatably coupled together.

4. A clutch device comprising:
an input disc rotatably and axially movably supported on an outer peripheral portion of an output shaft;
an output disc fixed to the outer peripheral portion of the output shaft; and
a biasing member configured to press the input disc against the output disc, wherein
the input disc is separated from the output disc against biasing force of the biasing member by a rotation load applied to the output shaft,
an output-disc-side surface of the input disc and an input-disc-side surface of the output disc are provided with tooth portions, the tooth portions overlapping with each other and being disengageable in an axial direction,
each tooth portion is configured such that a recessed portion and a raised portion formed continuously in a radial direction are alternately arranged in a circumferential direction,
each of the recessed portion and the raised portion is formed in such a curved shape that the each of the recessed portion and the raised portion is maintained at an identical height while a circumferential width thereof continuously expands in a radial outward direction,
the recessed portion and the raised portion are formed such that a pressure angle of a pressure-contact portion between the raised portion of the input disc and the raised portion of the output disc continuously increases in the radial outward direction of each disc by the rotation load, and
the recessed portion and the raised portion are formed such that a relationship of $\theta \geq \tan^{-1}\mu$ is satisfied at any position in the disc radial direction, where the pressure angle is $\theta$ and a coefficient of static friction between both discs is $\mu$.

5. The clutch device according to claim 4, wherein
dimensions of each portion are set to satisfy relationships of $$p = 2\pi r/n,$$

$$R = 7\pi r/2n \cos\theta,$$

$$w = \pi r/n, \text{ and}$$

$$h = R(1 - \sin\theta) = \text{Constant},$$

where a pitch of the raised portion in a case of an optional radius r of each disc is p, a radius of a surface of the raised portion in the case of the radius r is R, the circumferential width of the raised portion is w, a height of the raised portion is h, and the number of raised portions at each disc is n.

6. A motor unit including the clutch device according to claim 4, comprising:
in a case,
a motor provided with a drive gear on a front side of a rotor shaft, and
a driven shaft being substantially parallel to the rotor shaft and having a driven gear on a back side with respect to the front side,
wherein rotation force of the drive gear is transmitted to the driven gear by a gear mechanism to rotate the driven shaft,
the driven shaft is used as the output shaft,
the driven shaft is provided with the output disc, the input disc, and the biasing member, and
the driven gear and the input disc are integrally and rotatably coupled together.

7. The clutch device according to claim 4, wherein
the recessed portion and the raised portion are in arc sectional shapes symmetrical to each other, and are each formed such that a radius thereof continuously increases in the radial outward direction of each disc.

* * * * *